Sept. 5, 1950      W. MIKELSON      2,521,531

WIND VELOCITY AND DIRECTION METER

Filed June 8, 1948

Inventor:
Walter Mikelson,
by *Prowell P. Mack*
His Attorney.

Patented Sept. 5, 1950

2,521,531

UNITED STATES PATENT OFFICE 2,521,531

WIND VELOCITY AND DIRECTION METER

Walter Mikelson, Schenectady, N. Y., assignor to General Electric Company, a corporation of New York Application June 8, 1948, Serial No. 31,812

5 Claims. (Cl. 73—189)

1

This invention relates to improved apparatus for measuring the velocity and direction of fluid flow, particularly wind velocity and direction.

An object of the invention is to provide improved and simplified remote indicating apparatus of the type described.

Another object of the invention is to provide rugged apparatus capable of withstanding high wind velocities such as are encountered in hurricanes.

Another object of the invention is to provide apparatus having improved sensitivity to sudden gusts and changes in wind velocity or direction.

Other objects and advantages of the invention will become apparent as the description proceeds.

Figure 1:
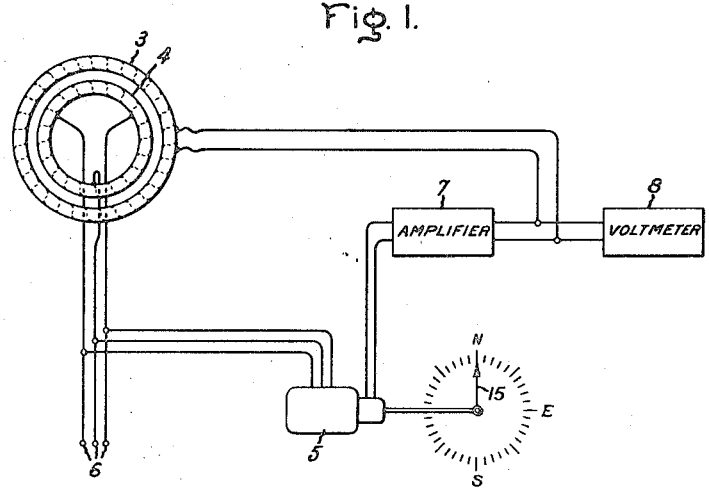
Figure 2:
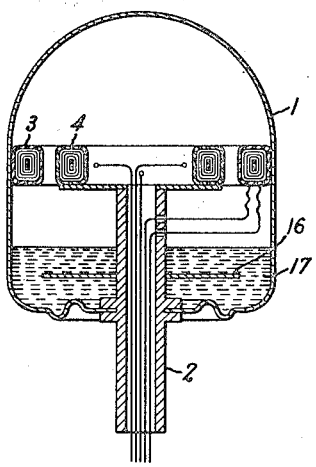
Figure 3:
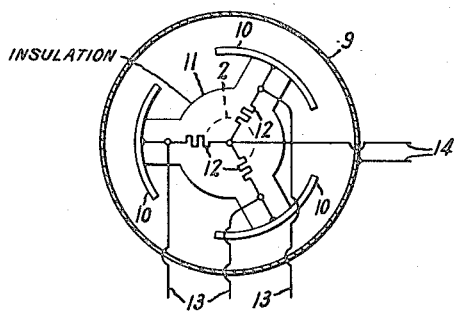

The features of the invention which are believed to be novel and patentable are pointed out in the claims forming a part of this specification. For a better understanding of the invention reference is made in the description that follows to the accompanying drawing in which Fig. 1 is a schematic diagram of a preferred embodiment of the invention; Fig. 2 is a vertical cross section of one form of a wind-responsive member and its associated electrical position detector, and Fig. 3 is a schematic plan view of an alternate form of electrical position detector which may be used in apparatus embodying this invention. Parts which appear in more than one view are indicated by the same numeral throughout the drawing.

Referring now to Fig. 2, a wind-responsive member 1 is resiliently mounted at the top of a stationary shaft 2. Member 1 may be any one of a variety of shapes, such as spherical or cylindrical, having a substantially circular horizontal cross section so that the same area will be presented to the wind regardless of the direction of the wind flow. Because of its resilient mounting to shaft 2, the force of wind striking member 1 will displace it slightly from its neutral position with respect to shaft 2 by an amount and direction dependent upon the velocity and direction of the wind. In a simple form of the apparatus, as illustrated in Fig. 2, the necessary resilience can be achieved by a simple flexing at the base of member 1. In more sensitive apparatus, spring mounting or other resilient mounting means may be employed. Preferably, member 1 is hollow, as illustrated, so that an electrical position detector as hereinafter described, and also damping means, can be located inside the wind-responsive member.

Referring now to Figs. 1 and 2, an electrical

2 position detector illustrated comprises two windings 3 and 4, one of which is fixedly attached to member 1 and the other of which is fixedly attached to shaft 2. These windings are substantially concentric; and, in the preferred form illustrated, both are toroidal windings lying substantially in the same horizontal plane. The outer winding 3 is a two-terminal, single-phase toroidal winding; and the inner winding 4 is a continuous, three-phase toroidal winding having three equally spaced-apart taps. The relative positions of the two windings may be interchanged; that is, the inner winding may be made the two-terminal, single-phase winding and the outer winding made the continuous, three-phase winding, without changing the operating principle of the invention.

A direction-indicator Selsyn receiver 5, of the well-known type having a three-phase field and a single-phase armature, provides a visual or recorded indication of wind direction as hereinafter described. Means are provided to energize winding 4 and the field of Selsyn 5 from a common three-phase, alternating-current source. This may be done by connecting the three taps of winding 4 and the three leads from the three-phase field of Selsyn 5 to three terminals 6 as shown, which may be connected to any convenient three-phase alternating-current source.

In the absence of wind or other external force, member 1 is held in a neutral position by its resilient mounting. In this neutral position, windings 3 and 4 are concentric and corresponding parts of the two windings are spaced a uniform distance apart. In this position, winding 3 has equal magnetic flux linkages with all parts of three-phase winding 4; and no net induced voltage appears between the two terminals of winding 3, since equal voltages are induced in winding 3 by each section of three-phase winding 4. These induced voltages have such mutual phase relations that they cancel one another. When wind strikes member 1, it is displaced from its neutral position by an amount and direction dependent upon the velocity and direction of the wind, and winding 3 is likewise displaced relative to winding 4. The two windings thus become slightly eccentric, and corresponding parts of the two windings are then spaced non-uniform distances apart. When this happens, the flux linkage between winding 3 and some parts of winding 4 is greater than the flux linkage of winding 3 and other parts of winding 4; so that the voltages induced in winding 3 by respective parts of winding 4 are no longer equal, and a net induced voltage is present across the two terminals of winding 3. It is evident that the magnitude of this net induced voltage depends upon the degree of eccentricity of the two windings, and hence upon the velocity of the wind. Also, the phase of the voltage between the two terminals of winding 3 is dependent upon which portions of windings 3 and 4 are nearest together, and hence upon the direction of the wind.

An amplifier 7 is connected as shown to energize the single-phase armature of Selsyn 5 with a voltage having a fixed phase relation to the voltage across the terminals of winding 3. Preferably, amplifier 7 is a vacuum tube amplifier having automatic-volume-control characteristics, so that the armature of Selsyn 5 is adequately energized independently of the amplitude of voltage across the two terminals of winding 3. As is well known, the rotor of such a Selsyn receiver assumes a position dependent upon the phase of voltage energizing its armature. The rotor position thus corresponds to the direction of the wind, and can be used to drive the pointer of a visual indicator 15, or can be connected to a recorder or other apparatus.

An A.-C. voltmeter 8, preferably a vacuum tube voltmeter, is connected as shown to be responsive to the voltage amplitude across the two terminals of winding 3. Voltmeter 8 thus gives a visual indication which is a measure of wind velocity. It is apparent that the voltmeter may be replaced by a recorder or other apparatus if desired.

The apparatus described provides a remote indicating wind velocity and direction meter which is unusually simple and rugged. Only the wind-responsive element 1 and shaft 2 need be exposed to the wind. These elements can be made extremely rugged so that the apparatus described can withstand and measure winds of hurricane force which would destroy conventional weather vanes and anemometers. On the other hand, member 1 can be designed to deflect in very slight winds, thus making an instrument of unusually high sensitivity. Furthermore, the absence of rotating parts in the wind-responsive element greatly reduces the inertia encountered, so that the apparatus is extremely sensitive to short gusts and sudden changes in wind direction and velocity. All electrical parts of the transmitter are completely inclosed in the dust and moisture-tight housing 1 and are thus protected.

Damping may be provided to prevent vibratory oscillation of member 1. One form of damping, as illustrated, comprises a damping vane 16 attached to shaft 2, and a viscous liquid 17, such as silicone oil, filling member 1 to a level about the damping vane. Vane 16 may be a horizontal disk attached to shaft 2.

It will be apparent to those skilled in the art that many modifications can be made in the constructional details of this apparatus without departing from the principles of the invention, as has been pointed out. Many different arrangements for resiliently mounting member 1 may be contrived through the exercise of mechanical skill. The electrical position detector may be located at various places, either inside or outside of member 1, depending upon its shape and the manner in which it is mounted upon shaft 2. Coils 3 and 4 may be wound in various ways. For example, coil 4 could be any conventional type of three-phase motor armature winding. Other phase-sensitive devices may be employed in place of Selsyn receiver 5 to indicate the voltage phase between the two terminals of winding 3, including cathode-ray oscilloscope phase indicators.

Figure 3 is a schematic plan view of an alternate form of electrical position detector. An electrically conducting annular element 9 can be a metal ring attached to the inside of member 1, or it can be a side of member 1 itself. Three electrically conducting arcuate elements 10 are supported by a non-conducting spider 11 which in turn is attached to shaft 2. Elements 10 preferably are equally spaced-apart around the inner circumference of element 9, and are spaced from element 9 by equal distances when member 1 is in its neutral position and by unequal distances when member 1 is displaced from its neutral position. Element 9 and elements 10 in effect form three star-connected capacitors, equally spaced-apart around member 1 and shaft 2, and variable in their relative impedances responsive to displacement of member 1 from its neutral position. Three equal fixed impedances 12 are also star-connected, and are connected to be energized in parallel with the star-connected capacitors from the same three-phase alternating current source. Alternating current energization is supplied through connections 13. Single-phase connections 14 are provided between element 9, which is in effect the center terminal of the three star-connected capacitors, and the center terminal of the three star-connected fixed impedances 12. It is apparent that when member 1 is in its neutral position, so that the three elements 10 are all equally distant from element 9, there is no voltage between the two leads of single phase connections 14; but when member 1 is displaced from its neutral position, the respective distances from element 9 of the three elements 10 are unequal, and a voltage appears between the two leads of connections 14 which depends in magnitude and phase upon the degree and direction of displacement of member 1. Fixed impedances 12 are "fixed" in the sense that their value does not vary responsive to changes in position of member 1. It is desirable, however, that their values be slightly adjustable to facilitate accurate balancing of the two center-terminal voltages, to obtain true zero voltage between the leads of connections 14 when member 1 is in its neutral position.

Having described the principle of this invention and the best mode in which I have contemplated applying that principle, I wish it to be understood that the apparatus described is illustrative only, and that other means can be employed without departing from the true scope of the invention defined by the following claims.

What I claim as new and desire to secure by Letters Patent of the United States is:

1. A fluid-flow velocity and direction meter comprising a stationary member, a flow-responsive member of substantially circular cross-section in the plane of the fluid flow to be measured, resiliently mounted upon said stationary member so that fluid flowing past the flow-responsive member displaces it from its neutral position relative to the stationary member by an amount and direction dependent upon the velocity and direction of such fluid flow, a poly-phase winding, a two-terminal, single-phase winding, one of said windings being fixedly attached to said stationary member and the other being fixedly attached to said flow-responsive member, said two windings being substantially concentric in a plane parallel to the fluid flow, corresponding parts of the two windings being spaced a uniform distance apart when the flow-responsive member is in its neutral position and spaced non-uniform distances apart when the flow-responsive member is displaced from its neutral position, means to energize said poly-phase winding from a poly-phase alternating-current source, direction-indicating means responsive to the voltage phase across the two terminals of said single-phase winding, and velocity-indicating means responsive to the voltage amplitude across said two terminals.

2. A wind velocity and direction meter comprising a vertical shaft, a hollow, wind-responsive member, substantially circular in horizontal cross-section, resiliently mounted at the top of said shaft so that wind striking the hollow member displaces it from its neutral position relative to the shaft by an amount and direction dependent upon the velocity and direction of such wind, an inner winding fixedly attached to said shaft, an outer winding fixedly attached to said hollow member, said two windings being concentric in a horizontal plane when the hollow member is in its neutral position and being eccentric when the hollow member is displaced from its neutral position, one of said windings being a three-phase winding and the other being a two-terminal single-phase winding, a direction-indicator Selsyn receiver having a three-phase field and a single-phase armature, means to energize said three-phase winding and said three-phase field from a common three-phase alternating-current source, means to energize said single-phase armature in fixed phase relation with the voltage across the two terminals of said single-phase winding, and a velocity-indicator voltmeter connected to be responsive to the voltage amplitude across said two terminals.

3. A wind velocity and direction meter comprising a vertical shaft, a hollow, wind-responsive member, substantially circular in horizontal cross-section, resiliently mounted at the top of said shaft so that wind striking the member displaces it from its neutral position relative to the shaft by an amount and direction dependent upon the velocity and direction of such wind, a continuous toroidal winding having three equally spaced-apart taps, a two-terminal toroidal winding, one of said windings being fixedly attached to said shaft and the other of said windings being fixedly attached to said hollow member, said two windings lying substantially in the same horizontal plane, one inside the other and both inside said hollow member, said two windings being concentric when the hollow member is in its neutral position and being eccentric when the hollow member is displaced from its neutral position, a direction-indicator Selsyn receiver having a three-phase field and a single-phase armature, means to energize said continuous toroidal winding and said three-phase field from a common three-phase alternating-current source, an amplifier, having automatic-volume-control characteristics, connected to energize said single-phase armature in fixed phase relation with the voltage across the two terminals of said two-terminal toroidal winding, and a velocity-indicator voltmeter connected to be responsive to the voltage amplitude across said two terminals.

4. A fluid flow velocity and direction meter comprising a stationary member, a flow-responsive member of substantially circular cross-section in the plane of the fluid flow to be measured, resiliently mounted upon said stationary member so that fluid flowing past the flow-responsive member displaces it from its neutral position relative to the stationary member by an amount and direction dependent upon the velocity and direction of such fluid flow, a plurality of star-connected variable impedances, each variable in impedance responsive to dimensional changes and each attached at respective ends to said stationary member and said flow-responsive member, said variable impedances being spaced-apart around said members in a plane parallel to the fluid flow, a plurality of star-connected fixed impedances, means to energize said variable impedances and said fixed impedances from a common poly-phase alternating-current source, direction indicating means responsive to the voltage phase between the center terminals of said star-connected variable impedances and the center terminal of said star-connected, fixed impedances, and velocity-indicating means responsive to the voltage amplitude across said two terminals.

5. A wind velocity and direction meter comprising a vertical shaft, a hollow, wind-responsive member, substantially circular in horizontal cross-section, resiliently mounted at the top of said shaft so that wind striking the member displaces it from its neutral position relative to the shaft by an amount and direction dependent upon the velocity and direction of such wind, an electrical position detector having two parts fixedly attached to said shaft and to said hollow member respectively, one of said parts comprising an electrically-conducting annular element, the other of said parts comprising three electrically-conducting elements equally spaced-apart around said annular element and separated from the annular element by equal distances when said hollow member is in its neutral position and by unequal distances when said hollow member is displaced from its neutral position, thus forming three star-connected capacitors equally spaced-apart around said shaft and said hollow member and variable in their relative impedances responsive to displacement of the hollow member from its neutral position, three equal, star-connected, fixed impedances, a direction-indicator Selsyn receiver having a three-phase field and a single-phase armature, means to energize said star-connected capacitors, said star-connected fixed impedances, and said three-phase field from a common three-phase alternating-current source, an amplifier, having automatic-volume-control characteristics, connected to energize said single-phase armature in fixed phase relation with the voltage between the center terminal of said star-connected capacitors and the center terminal of said star-connected fixed impedances, and a velocity-indicator voltmeter connected to be responsive to the voltage amplitude between said center terminals.

WALTER MIKELSON.

REFERENCES CITED

The following references are of record in the file of this patent:

UNITED STATES PATENTS

| Number | Name | Date |
| --- | --- | --- |
| 2,098,099 | Kahn | Nov. 2, 1937 |
| 2,390,384 | Poole | Dec. 4, 1945 |